United States Patent
Lin (10) Patent No.: US 7,277,592 B1
(45) Date of Patent: Oct. 2, 2007

(54) SPACIAL DEBLOCKING METHOD USING LIMITED EDGE DIFFERENCES ONLY TO LINEARLY CORRECT BLOCKING ARTIFACT

(75) Inventor: Tao Lin, Shanghai (CN)

(73) Assignee: Redrock Semiconductory Ltd., Sunnyvale, CA (US)

( * ) Notice: Subject to any disclaimer, the term of this patent is extended or adjusted under 35 U.S.C. 154(b) by 903 days.

(21) Appl. No.: 10/605,695

(22) Filed: Oct. 21, 2003

(51) Int. Cl.
*G06K 9/40* (2006.01)

(52) U.S. Cl. ............... 382/268; 382/233; 382/252; 382/275; 375/240.29

(58) Field of Classification Search ............... 382/233, 382/252, 268, 275; 358/426.01–426.16; 375/240.29
See application file for complete search history.

(56) References Cited

U.S. PATENT DOCUMENTS

| | | | |
|---|---|---|---|
| 5,454,051 A | 9/1995 | Smith ................... | 382/233 |
| 5,590,064 A | 12/1996 | Astle ................... | 708/203 |
| 5,629,778 A | 5/1997 | Reuman ................. | 382/252 |
| 5,796,875 A * | 8/1998 | Read .................... | 382/261 |
| 5,883,983 A | 3/1999 | Lee et al. .............. | 382/268 |
| 5,949,908 A | 9/1999 | Sugahara ............... | 382/232 |
| 5,974,196 A * | 10/1999 | Chang et al. ........... | 382/268 |
| 6,040,879 A | 3/2000 | Park .................... | 375/240.27 |
| 6,115,503 A | 9/2000 | Kaup .................... | 382/26 |
| 6,144,700 A | 11/2000 | Kim et al. .............. | 375/240.03 |
| 6,160,503 A | 12/2000 | Andrews et al. ......... | 341/94 |
| 6,225,923 B1 | 5/2001 | Andrews ................ | 341/94 |
| 6,240,135 B1 | 5/2001 | Kim ..................... | 375/240.01 |
| 6,298,161 B1 | 10/2001 | Koo et al. .............. | 382/233 |
| 6,456,394 B1 | 9/2002 | Gwaltney et al. ........ | 358/1.9 |
| 6,529,638 B1 | 3/2003 | Westerman .............. | 382/275 |
| 6,539,060 B1 | 3/2003 | Lee et al. .............. | 375/240.29 |
| 6,859,499 B2 * | 2/2005 | Hashimoto .............. | 375/240.27 |
| 7,215,823 B2 * | 5/2007 | Miura et al. ............ | 382/268 |
| 2001/0020906 A1 | 9/2001 | Andrews et al. ......... | 341/94 |
| 2001/0021276 A1 * | 9/2001 | Zhou .................... | 382/266 |
| 2003/0035586 A1 * | 2/2003 | Chou et al. ............ | 382/233 |

OTHER PUBLICATIONS

Chou et al "Simple Alogrithm for Removing Blocking Artifacts in Block-Transform Coded Images"; Jim Chou, Matthew Crouse, and Kannan Ramchandarn; IEEE Signal Processing Letters, vol. 5, No. 2, Feb. 1998.*

Fununaga et al., "MPEG-4 Video Verification Model version 13.3", ISO/IEC JTC1/SC29/WG11, MPEG99/4960. Oct. 1999, section 9.1 DeBlocking Filter, ppl. 1, 257-259.

* cited by examiner

*Primary Examiner*—Bhavesh M Mehta
*Assistant Examiner*—Christopher Lavin
(74) *Attorney, Agent, or Firm*—g Patent LLC; Stuart T. Auvinen (57) ABSTRACT

A de-blocking method smoothes pixels along a row or column that crosses a block boundary. Smoothing is performed to remove quantization or compression artifacts that appear on block edges when pixels in adjacent blocks are separately compressed. A maximum-allowed edge-pixel difference is generated from the quantization parameter QP. For each edge-crossing row or column, an edge difference is generated as half the difference between adjacent edge pixels in two blocks. This edge difference is compared to the maximum-allowed edge-pixel difference. When the edge difference is larger than the maximum-allowed edge-pixel difference, then the difference is limited to the maximum-allowed edge-pixel difference, since the pixel difference may be a real edge in the image. The limited or edge difference is then added or subtracted in decreasing amounts for several pixels in the row or column near the edge, smoothing the edge difference across several pixels, such as seven pixels.

20 Claims, 6 Drawing Sheets

PRIOR ART

SPACIAL DEBLOCKING METHOD USING LIMITED EDGE DIFFERENCES ONLY TO LINEARLY CORRECT BLOCKING ARTIFACT

BACKGROUND OF INVENTION

This invention relates to video compression, and more particularly for spatial de-blocking methods.

Video data can greatly enhance the quality of a computing experience. The consumer use of the Internet took off once graphics was linked to earlier text-based web pages. Portable consumer devices such as cell phones and personal digital assistant (PDA's) are being equipped with small cameras to allow for capture of still or even video pictures. Efficient transmission of captured images over limited-bandwidth links requires some sort of compression of the images.

A number of video-compression techniques are known. Compression standards, such as those developed by the motion-picture-experts group (MPEG), have been widely adopted. These compression techniques are lossy techniques, since some of the picture information is discarded to increase the compression ratio. However, compression ratios of 99% or more have been achieved with minimal noticeable picture degradation.

Next-generation compression standards have been developed for transmitting video over wireless networks. The MPEG-4 standard provides a robust compression technique for transmission over wireless networks. Recovery can occur when parts of the MPEG-4 bit stream is corrupted.

These MPEG standards ultimately break the image up into small 16×16 pixel macroblocks or even smaller 8×8 pixel blocks. Each block can then be compressed more or less independently of other blocks, and movement of blocks can be described as highly compressed "motion vectors" rather than large bitmaps of pixels.

Figure 1:
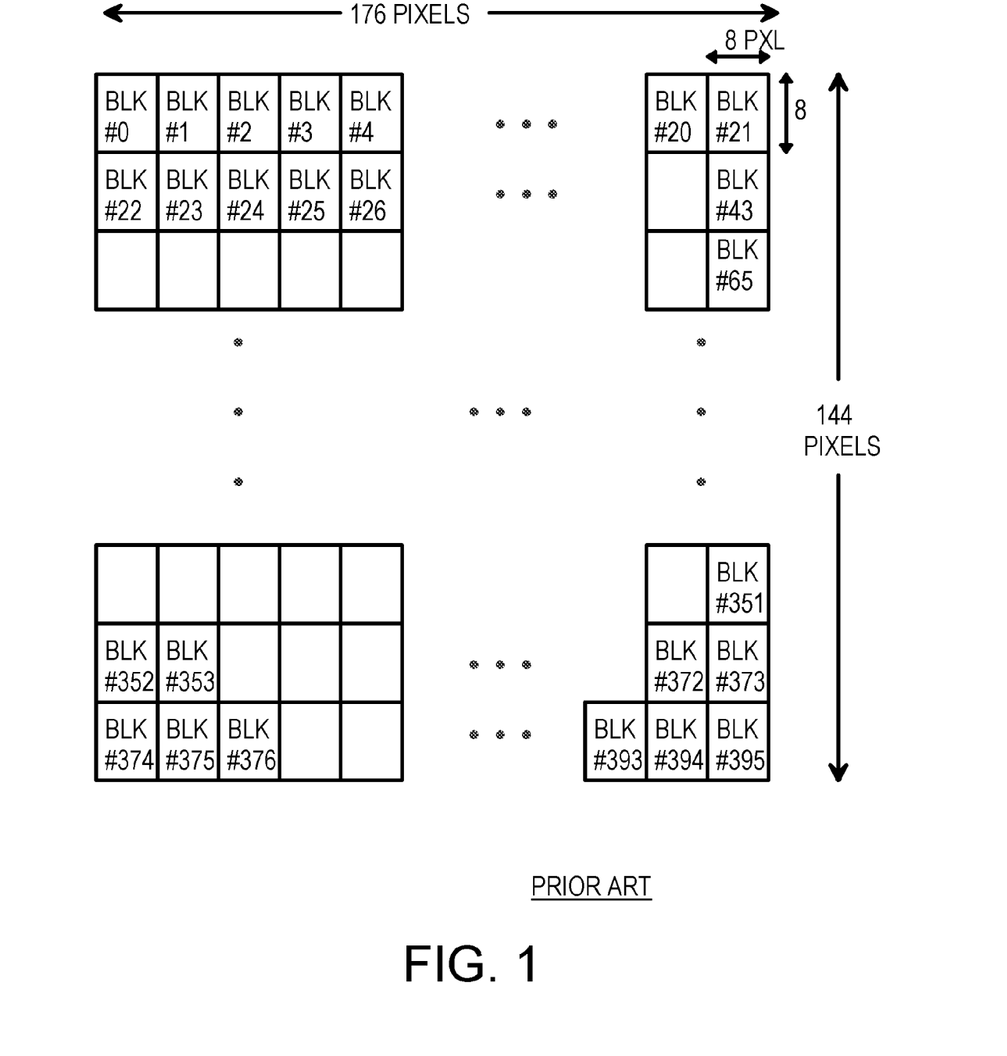
FIG. 1 shows an image frame divided into rows and columns of blocks.

FIG. 1 shows an image frame divided into rows and columns of blocks. The MPEG standard uses a divide-and-conquer technique in which the video sequence is divided into individual image frames known as video object planes (VOPs), and each frame is divided into rows and columns of macroblocks. Each macroblock is a rectangle of 16 by 16 pixels. Each macroblock can be further divided into 8×8 blocks.

Various window sizes and image resolutions can be supported by MPEG standards. For example, one common format is an image frame of 176 by 144 pixels. The image frame is divided into 18 rows of 8×8 blocks, with each row having 22 blocks each of 8×8 pixels. A total of 396 blocks are contained in each frame.

The blocks are arranged in a predetermined order, starting in the upper left with the first block (BLK #0). The second block, BLK #1, is to the right of BLK #0 in the first row, followed by blocks #2 to BLK #21 in the first row. The second row contains BLK #22 to BLK #43. The last row contains BLK #374 to BLK #395. Of course, other image sizes and formats can have the blocks in rows of various lengths, and various numbers of rows.

When an image frame is encoded, each block is encoded in order, starting with BLK #0 in the first row, and continuing with BLK #1, BLK #2 to BLK #21 in the first row, then BLK #22 to BLK #43 in the second row, and on until the last row with BLK #374 to BLK #395. The blocks are arranged in the bit stream into one or more video packets (VP) with a header.

Since each bock is compressed separately from other blocks, there can be noticeable discontinuities at block edges. For example, an highly-compressed image of a blue sky may have visible color-change bands caused by blocking artifacts. While the actual sky changes gradually from one shade of blue to another, only a few blue shades may be used to represent the sky in the compressed image. Several rows of blocks may code all pixels as a dark shade of blue while a next row codes all pixels as a lighter shade of blue. An abrupt color change may be noticeable at the edge of the row. When the color change boundary moves diagonally or crosses rows, the row crossing may cause a stair-step of jagged block edges to be visible.

Figure 2A:
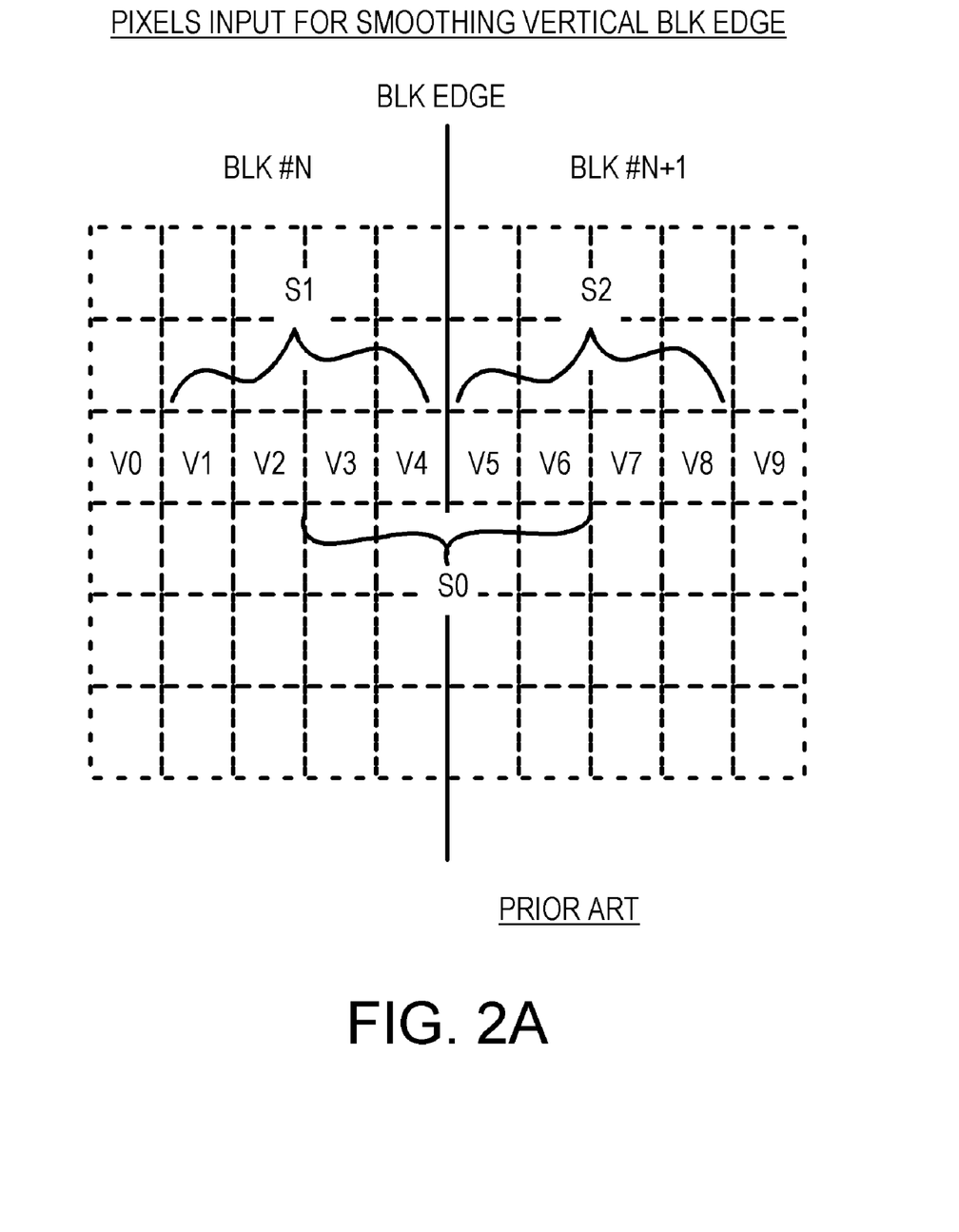
FIGS. 2A-B show prior-art de-blocking filter applied to vertical and horizontal block edges.
Figure 2B:
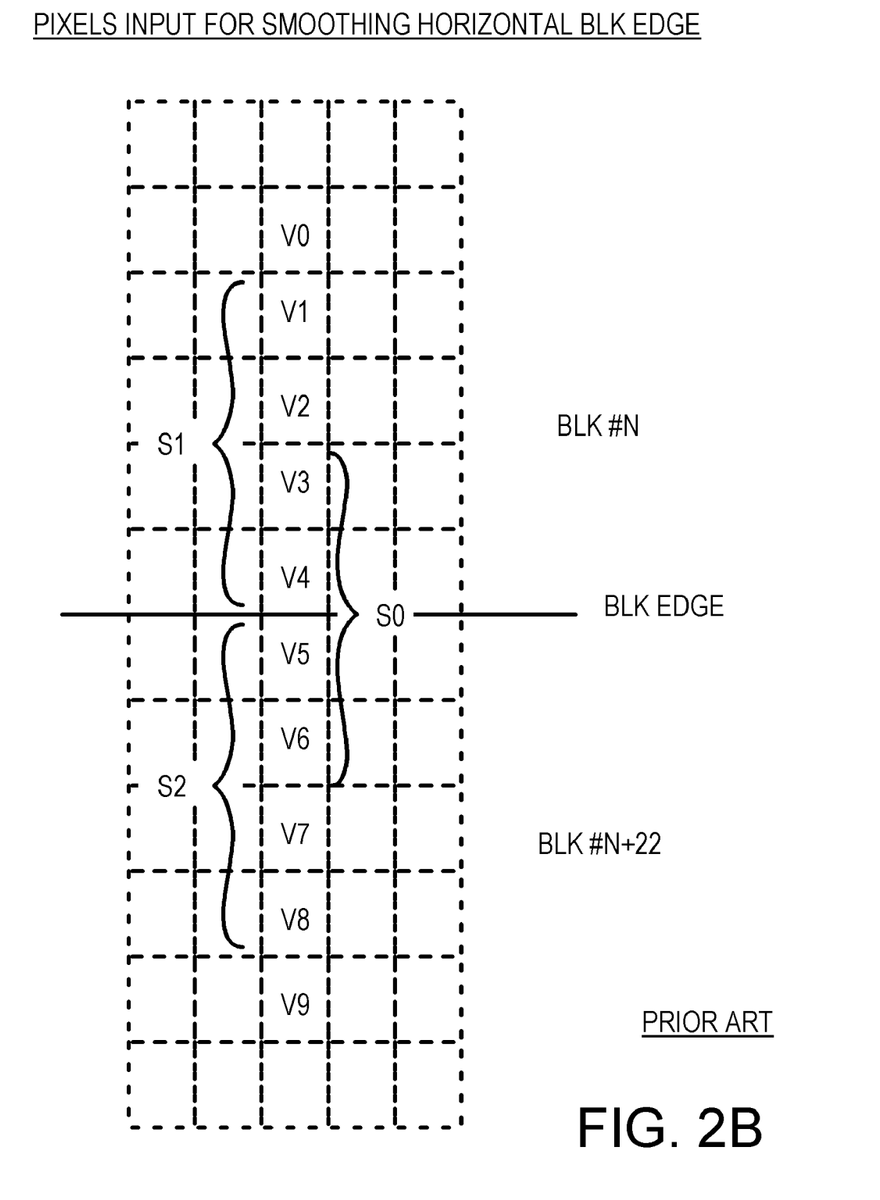

MPEG decoders may use a de-blocking filter to reduce the visibility of such blocking artifacts. Filters can be applied along block edges, both vertical and horizontal edges. See for example the ISO/IEC JTC1/SC29/WG11 standard's working group document m4960.doc: section 9.1 De-Blocking Filter. FIGS. 2A-B show prior-art de-blocking filter applied to vertical and horizontal block edges. In FIG. 2A, a row of pixels V0, V1, . . . V9 crosses a vertical boundary between two 8×8 blocks, BLK #N and BLK #N+1. Pixel V4 is the last pixel in BLK #N, while pixel V5 is the first pixel in block #N+1.

Due to compression, a noticeable color difference may appear between pixels V4 and V5. The prior-art de-blocking filter combines pixels V1, V2, V3, V4 in BLK #N using the S1 smoothing filter, pixels V5, V6, V7, V8 in BLK #N+1 using the S2 smoothing filter, and pixels V3, V4, V5, V6 that cross the boundary using the S3 smoothing filter.

In FIG. 2B, a column of pixels V0, V1, . . . V9 crosses a horizontal boundary between two 8×8 blocks, BLK #N and BLK #N+22 in the next row. Pixel V4 is the last pixel in BLK #N, while pixel V5 is the first pixel in block #N+22.

Due to compression, a noticeable color difference may appear between pixels V4 and V5. The prior-art de-blocking filter combines pixels V1, V2, V3, V4 in BLK #N using the S1 smoothing filter, pixels V5, V6, V7, V8 in BLK #N+22 using the S2 smoothing filter, and pixels V3, V4, V5, V6 that cross the boundary using the S3 smoothing filter.

The smoothing filters can be re-applied for each of the 8 columns and each of the 8 rows in each 8×8 block, for all blocks in a frame. The pixel inputs V1, V2 . . . V8 can be shifted to the right by one column, or down by one row, and the operations repeated on the new inputs.

Figure 3:
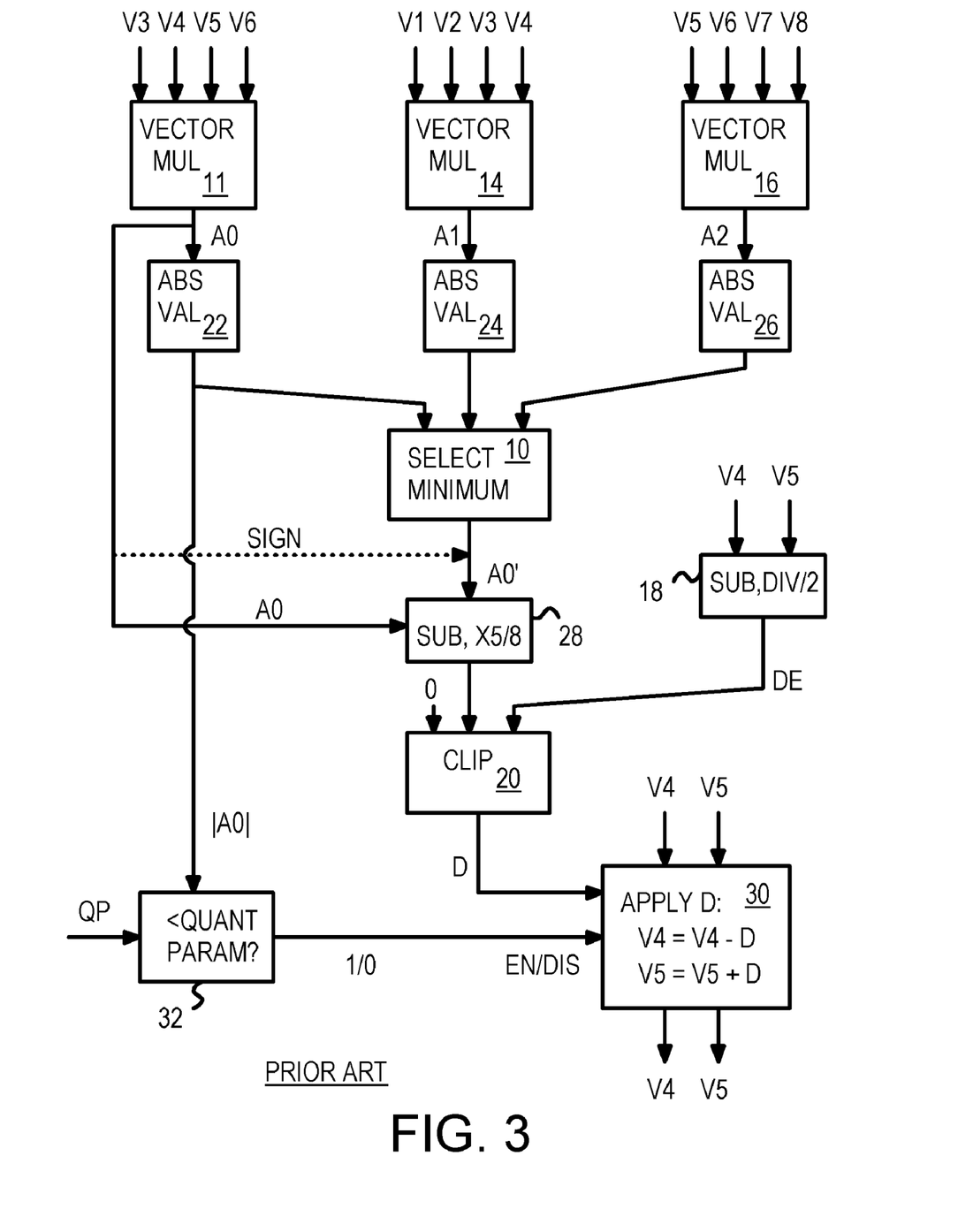
FIG. 3 is a diagram highlighting computational steps performed during a prior-art de-blocking process.

FIG. 3 is a diagram highlighting computational steps performed during a prior-art de-blocking process. The three 4-pixel groups S0, S1, S2 are input to vector multipliers 11, 14, 16. Vector multiplier 11 receives pixels V3, V4, V5, V6 that cross the horizontal or vertical boundary, and generates frequency component A0 as the inner product of the S0 pixel vector and the transposed ([ . . . ]$^T$) discrete cosine transform (DCT) kernel [2−5 5 2]$^T$:

$$A0 = ([2{-}5 5 2] * [V3\,V4\,V5\,V6]^T)/8$$

Vector multiplier 14 receives pixels V1, V2, V3, V4 in BLK #N, and generates frequency component A1 as the inner product of the S1 pixel vector and the DCT kernel:

$$A1 = ([2{-}5 5 2] * [V1\,V2\,V3\,V4]^T)/8$$

Vector multiplier 16 receives pixels V5, V6, V7, V8 in BLK N+1 or N+22, and generates frequency component A2 as the inner product of the S2 pixel vector and the DCT kernel:

$$A2 = ([2{-}5 5 2] * [V5\,V6\,V7\,V8]^T)/8$$

These three inner products are frequency-domain components of the pixel arrays within the two blocks and crossing the block edge. The absolute values of frequency components A0, A1, A2 are generated by absolute-value generators 22, 24, 26, such as by dropping the sign bit. Minimum selector 10 then selects the minimum absolute value of A0, A1, A2. The original sign of S0 is applied to this selected minimum to generate A0'.

The original A0 is then subtracted from A0', the difference multiplied by 5 and integer-divided by 8 using calculator 28. The result is input to clipper 20, which clips the result to a value between 0 and DE. DE is half of the edge-pixel difference (V4−V5)/2, generated by pixel differencer 18. Thus clipper 20 limits extreme values to a range of 0 to (V4−V5)/2. The clipped difference value output by clipper 20 is D.

Applicator 30 then adds clipped difference D to edge pixel V5 to generate the filtered pixel V5. Clipped difference D is also subtracted from edge pixel V4 to generate the new filtered pixel V4. The filtered values of V4 and V5 replace the old values in the image to be displayed. The edge difference between pixels V4 and V5 is thus smoothed by D, reducing the change in pixel value from V4 to V5. This reduces visible color change at the block edge.

When the absolute value of the frequency component A0 (from the edge-crossing pixels) is greater than the quantization parameter QP, then condition checker 32 disables filtering for the current row or column. Large pixel differences may be caused by a real edge in the image, while smaller pixel differences are more likely caused by compression noise. When the absolute value of A0 is less than or equal to QP, then applicator 30 is enabled to add D to pixel V5 and subtract D from pixel V4.

A large amount of computational work is required for each pair of edge pixels that are smoothed. In particular, vector multipliers 11, 14, 16 each perform four multiplies and three adds, and a final divide-by-eight or 3-bit left-shift. While one arithmetic-logic-unit (ALU) or multiplier/adder/divider could be re-used three times, either the hardware required or the number of clock cycles to perform the three vector multiplies is significant. A total of 12 multiply operations is needed, and each multiply can be a full integer multiply rather than a simple right-shift multiply.

Since there are 300 or more blocks in each frame, and the de-blocking process may be repeated 16 times for each block, many computations may be performed by the de-blocking filter. It is therefore desirable to reduce computational complexity of the de-blocking filter. A more streamlined de-blocking filter is desirable.

DETAILED DESCRIPTION

The present invention relates to an improvement in de-blocking filters. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The inventor has realized that much of the computational work of the prior-art de-blocking method is consumed by the vector multiplies. A large number of pixels are input early in the de-blocking process to generate frequency components for smoothing.

The inventor realizes that computational work can be reduced by inputting fewer pixels for smoothing. Rather than inputting a large number of pixels, such as 8 pixels, only the 2 edge pixels are used to generate smoothing terms. However, the result of smoothing is applied to a wider range of pixels than just the 2 edge pixels. The smoothing difference is applied in decreasing amounts to pixels farther away from the edge. This produces a more visually appealing edge, since pixel changes are gradually applied across more pixels than just the two edge pixels.

Figure 4:
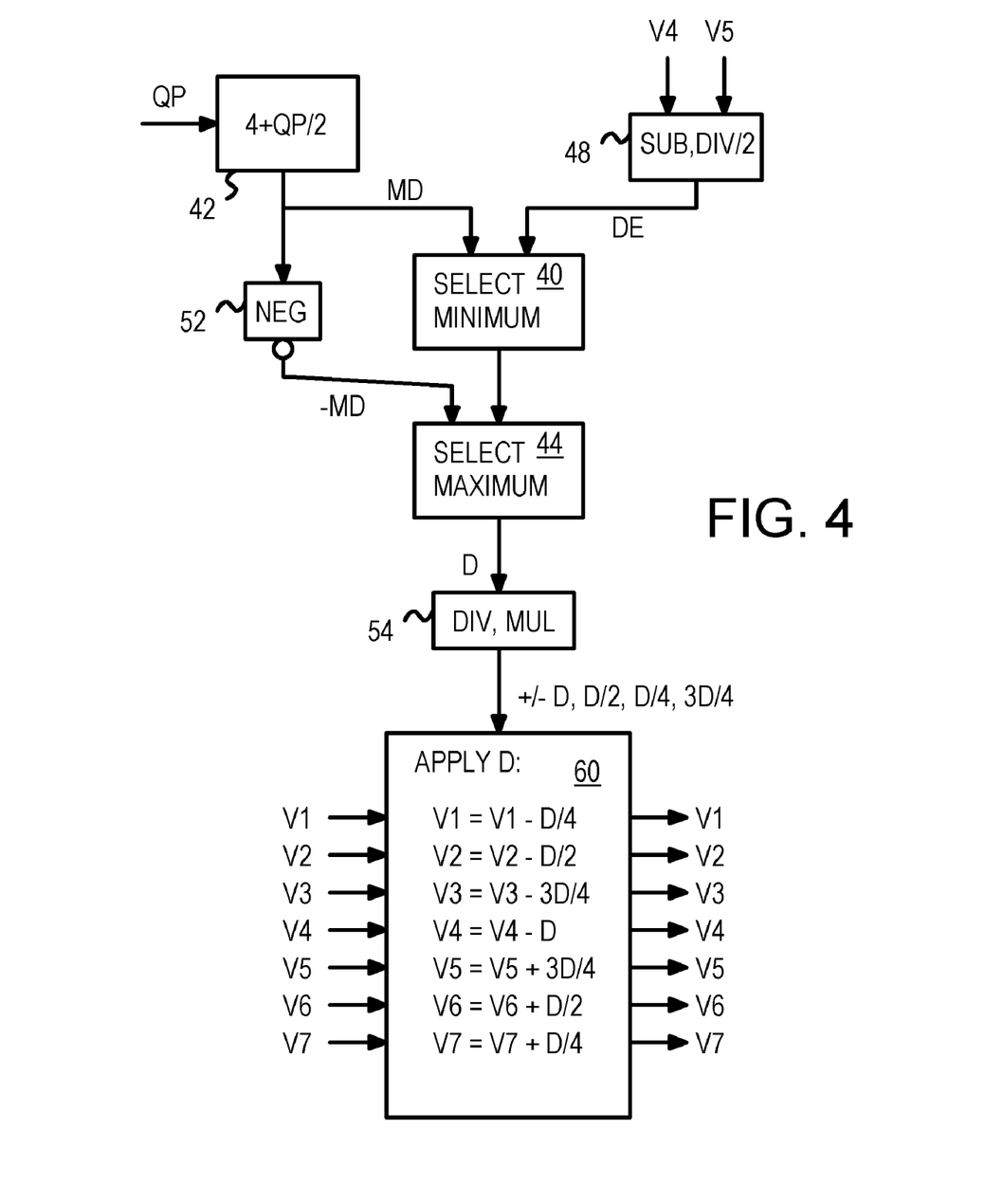
FIG. 4 highlights a computationally-simplified de-blocking process.

FIG. 4 highlights a computationally-simplified de-blocking process. Only the edge pixels V4, V5 are applied to the early parts of the de-blocking process. The full range V1, V2 . . . V8 of 9 pixels is not input until the end of the de-blocking process. The three vector multiplies of the prior art are eliminated, reducing computational load.

Edge pixels V4 of the current block and V5 of the next block are input to pixel differencer 48. Pixel differencer 48 generates the edge-pixel difference DE as (V4−V5)/2. The edge difference DE is input to minimum selector 40.

The quantization parameter QP for the current block N is input to maximum generator 42, which generates the maximum-allowed edge-pixel difference MD as 4+(QP/2). This equation is empirically determined to give good results, but other equations such as 5+QP/4 or 6+QP could be substituted. Minimum selector 40 selects the minimum of either MD or DE as its output. When the edge-pixel difference DE is large, greater than MD, then the quantization-parameter limited MD is selected by minimum selector 40. Otherwise edge-pixel difference DE is passed through.

The maximum-allowed edge-pixel difference MD is negated by negator 52, producing the two's complement of MD, −MD. Maximum selector 44 receives −MD and the minimum selected by minimum selector 40. The maximum is selected by maximum selector 44 and output as generated difference D. When edge-pixel difference DE is a negative number, it is passed through minimum selector 40, since QP is always positive. Then maximum selector 44 passes DE when DE is closer to 0 than −MD. Thus minimum selector 40 limits positive values of DE to within +MD, while maximum selector 44 limits negative values of DE to be between −MD and 0. A clipper could also be used.

The generated difference D from maximum selector 44 is then applied to divider/multiplier 54 to generate gradual smoothing values to apply to pixels. From generated difference D, positive and negative values of one-quarter, one-half, and three-quarters of D are generated, along with −D. Smoothing values −D/4, D/4, −D/2, D/2, −3D/4, 3D/4, and D are output by divider/multiplier 54.

Applicator 60 then applies the smoothing values generated by divider/multiplier 54 to a range of pixels in the current row or column. The full generated difference D is subtracted from edge pixel V4 in the current block, while three-quarters of D is added to edge pixel V5 in the next block.

Three-quarters of D is subtracted from adjacent pixel V3, while half of D is subtracted from next adjacent pixel V2 and only one-quarter of D is subtracted from more remote pixel V1.

In the next block, half of D is added to pixel V6, and one-quarter of D is added to pixel V7. Thus progressively smaller differences are added to pixels in the next block that are farther away from the block edge. Likewise, progressively smaller differences are subtracted from pixels in the current block that are farther away from the block edge.

Applicator 60 receives all 7 pixels and adjusts all 7 pixels to smooth the edge difference as follows in the current block:

$$V1=V1-D/4$$

$$V2=V2-D/2$$

$$V3=V3-3D/4$$

$$V4=V4-D$$

In the next block, applicator 60 continues to smooth the edge difference:

$$V5=V5+3D/4$$

$$V6=V6+D/2$$

$$V7=V7+D/4$$

Figure 5:
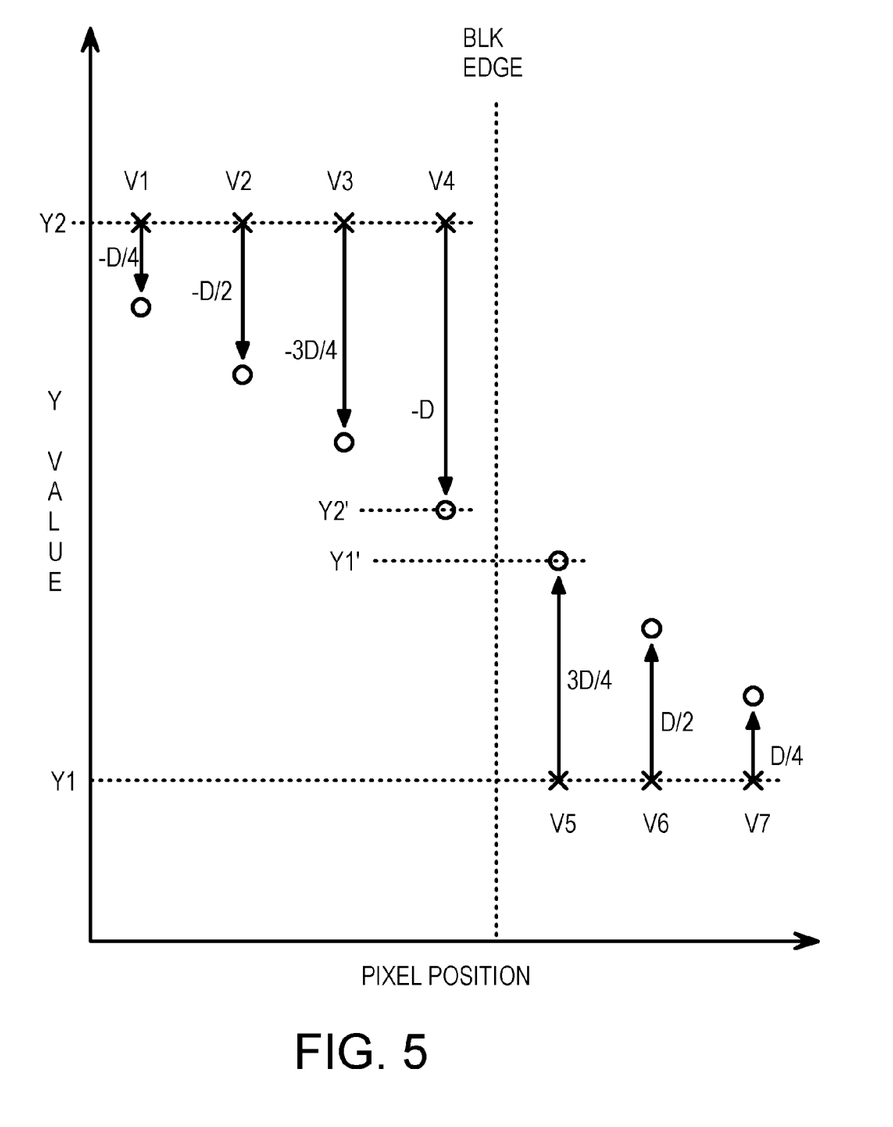
FIG. 5 is a graph of pixel values near a block edge before and after smoothing.

FIG. 5 is a graph of pixel values near a block edge before and after smoothing. The luminance Y values of pixels is plotted as the vertical axis while the pixel position along a row or column is shown on the horizontal axis. An abrupt change in pixel values occurs at the block boundary, between pixels V4 and V5. Compression approximations and losses that vary between the two blocks cause pixels V1, V2, V3, V4 in one block to have a higher Y value of Y2 than for pixels V5, V6, V7, V8 in the other block, which have pixel Y value Y1. In the real, uncompressed image, the Y pixel values decrease linearly from pixel V1 to V7, but compression causes the abrupt step in Y pixel values at the block edge.

The original, unfiltered pixel Y values are shown as X's in FIG. 5, while the new, filtered pixel Y values are shown as circles. As can be seen in FIG. 5, the unfiltered pixels (X's) show an abrupt step at the block boundary. However, the filtered pixels (O's) show a smooth transition between the two blocks.

The original pixel difference between pixels V4 and V5 at the block edge is Y2–Y1. The generated pixel difference D is half of this gap. Applicator 60 subtracts D from edge pixel V4 to get the filtered or smoothed V4 pixel, while 3/4 D is added to pixel V5. The new pixel difference at the block edge is Y2'–Y1', or about one-quarter of the original difference.

However, the pixel difference is not just smoothed between the two pixels V4, V5 on the block edge. Instead, progressively smaller amounts of the pixel difference D is added or subtracted from other pixels farther from the block edge. Pixels V2 and V6 have D/2 subtracted and added, while pixels V1 and V7 are adjusted by D/4. The result is a more gradual gradient of Y values across the block boundary.

ALTERNATE EMBODIMENTS

Several other embodiments are contemplated by the inventor. For example smoothing can be performed on a subset of the pixel components, such as just the luminance Y values, or on all pixel components, including the U, V chrominance values. The U, V components may be present for only half or one quarter of the pixel locations, such as for Bayer patterns and variants. RGB or other pixels could also be filtered.

All horizontal edges in a row of block, a pair of rows of blocks (one macroblock row), or in the entire image could be processed first, then the vertical edges processed. One macroblock of four 8×8 blocks or each 8×8 block could be processed for both horizontal and vertical before moving to the next macroblock of block. Other block sizes could be substituted, and different image or frame sizes could be processed.

The functional and computational blocks can be implemented in a variety of ways, such as by firmware routines in a digital-signal processor (DSP) chip, or in logic in a logic array chip, or as software routines executed by a processor, or a combination of techniques. The blocks can be partitioned in many different ways. A programmable register can allow calculations to be disabled, or allow for different threshold values or equations to be used to generated the maximum-allowed edge-pixel difference MD.

Other video formats, frame sizes, and block sizes could be supported. Many other functional blocks can exist in a complex MPEG decoder, and pipelining logic and staging registers may also be present. Various pipelining registers can be added. Different versions of the MPEG or other compression standards could be supported.

The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. 37 C.F.R. § 1.72(b). Any advantages and benefits described may not apply to all embodiments of the invention. When the word "means" is recited in a claim element, Applicant intends for the claim element to fall under 35 USC § 112, paragraph 6. Often a label of one or more words precedes the word "means". The word or words preceding the word "means" is a label intended to ease referencing of claims elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word means are not intended to fall under 35 USC § 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

The invention claimed is:

1. A de-blocking filter for smoothing block edges of decompressed images comprising:
   a maximum generator for generating a maximum-allowed edge-pixel difference as a function of a quantization parameter, the quantization parameter indicating a degree of compression of an image;

a difference generator, receiving pixel components from an edge pair of adjacent pixels in adjacent blocks, for generating an edge-pixel difference;

a limiter, receiving the maximum-allowed edge-pixel difference and the edge-pixel difference, for generating a difference term, the difference term being the edge-pixel difference when the edge-pixel difference is less than the maximum-allowed edge-pixel difference, but being the maximum-allowed edge-pixel difference when the edge-pixel difference is larger than the maximum-allowed edge-pixel difference;

a fractional difference generator, receiving the difference term from the limiter, for generating a plurality of fractional differences having a decreasing range of values that are fractions of the difference term; and an applicator, receiving pixel components from a current row of pixels that includes the edge pair of adjacent pixels in the adjacent blocks, for adding or subtracting the fractional differences from the fractional difference generator to pixel components for pixels in the current row;

wherein successive pixels successively farther from the edge pair of adjacent pixels have successively decreasing fractional differences added or subtracted, whereby edge-pixel differences are smoothed over the current row of pixels.

2. The de-blocking filter of claim 1 wherein the current row of pixels comprises at least seven pixels.

3. The de-blocking filter of claim 2 wherein the edge pair of adjacent pixels comprises a first current pixel in a current block and a first next pixel in a next block;

wherein the applicator further receives the difference term from the limiter, the applicator subtracting the difference term from the first current pixel, but adding a fractional difference to the first next pixel.

4. The de-blocking filter of claim 3 wherein the applicator adds a fractional difference of three-fourths of the difference term to the first next pixel in the next block.

5. The de-blocking filter of claim 4 wherein the current row of pixels comprises:

a second current pixel adjacent to the first current pixel in the current block;

a third current pixel adjacent to the second current pixel in the current block;

a fourth current pixel adjacent to the third current pixel in the current block;

a second next pixel adjacent to the first next pixel in the next block;

a third next pixel adjacent to the second next pixel in the next block.

6. The de-blocking filter of claim 5 wherein the applicator adds a fractional difference of one-half of the difference term to the second next pixel in the next block;

wherein the applicator adds a fractional difference of one-fourth of the difference term to the third next pixel in the next block;

wherein the applicator subtracts a fractional difference of three-fourths of the difference term to the second current pixel in the current block;

wherein the applicator subtracts a fractional difference of one-half of the difference term to the third current pixel in the current block;

wherein the applicator subtracts a fractional difference of one-fourth of the difference term to the fourth current pixel in the current block.

7. The de-blocking filter of claim 6 wherein the pixel components are luminance Y values of a YUV pixels.

8. The de-blocking filter of claim 1 wherein the maximum generator generates the maximum-allowed edge-pixel difference as a linear function of a quantization parameter.

9. The de-blocking filter of claim 8 wherein the maximum generator generates the maximum-allowed edge-pixel difference as one-half of the quantization parameter added to a constant.

10. The de-blocking filter of claim 9 wherein the constant is four.

11. The de-blocking filter of claim 1 further comprising:

a negator, receiving the maximum-allowed edge-pixel difference from the maximum generator, for generating a negative maximum-allowed edge-pixel difference;

wherein the limiter further comprises a negative limiter, receiving the negative maximum-allowed edge-pixel difference and the edge-pixel difference, for generating the difference term when the edge-pixel difference is negative, the difference term being the edge-pixel difference when the edge-pixel difference is between zero and the negative maximum-allowed edge-pixel difference, but being the negative maximum-allowed edge-pixel difference when the edge-pixel difference is more negative than the negative maximum-allowed edge-pixel difference.

12. A computer-implemented method for smoothing blocking artifacts causes by video-image compression comprising:

receiving a series of pixels that cross a block boundary, the series comprising in sequence a first pixel, a second pixel, a third pixel, a fourth pixel, a fifth pixel, a sixth pixel, and a seventh pixel;

wherein the first, second, third, and fourth pixels are in a first block and the fifth, sixth, and seventh pixels are in a second block;

wherein the fourth pixel and the fifth pixel comprise edge pixels in the series of pixels;

generating a limit value from a quantization parameter that indicates a degree of compression of pixels in the first block;

generating a negated limit value from the limit value;

generating an edge difference value as a difference of the fourth and fifth pixels;

selecting the edge difference value as a limited difference when the edge difference value is positive and less than the limit value;

selecting the edge difference value as the limited difference when the edge difference value is negative and greater than the negated limit value;

selecting the limit value as the limited difference when the edge difference value is positive and greater than the limit value;

selecting the negated limit value as the limited difference when the edge difference value is negative and less than the negated limit value;

generating fractional differences from the limited difference;

subtracting the limited difference from the fourth pixel to smooth the fourth pixel;

adding a largest one of the fractional differences to the fifth pixel to smooth the fifth pixel;

adding a smaller one of the fractional differences to the sixth pixel to smooth the sixth pixel; and subtracting a smaller one of the fractional differences from the third pixel to smooth the third pixel;

whereby the third, fourth, fifth, and sixth pixels in the series of pixels are smoothed with the fractional differences or the limited difference.

13. The computer-implemented method of claim 12 further comprising:
adding a smallest one of the fractional differences to the seventh pixel to smooth the seventh pixel;
subtracting a smaller one of the fractional differences from the second pixel to smooth the second pixel; and
subtracting the smallest one of the fractional differences from the first pixel to smooth the first pixel.

14. The computer-implemented method of claim 13 wherein the smallest one of the fractional differences is one-quarter of the limited difference;
wherein the largest one of the fractional differences is three-quarters of the limited difference;
wherein the smaller one of the fractional differences is one-half of the limited difference.

15. The computer-implemented method of claim 12 wherein generating the edge difference value as a difference of the fourth and fifth pixels comprises generating the edge difference value as half of the difference of the fourth and fifth pixels.

16. The computer-implemented method of claim 15 wherein the series of pixels comprise luminance Y values of YUV pixels.

17. A computer-program product comprising:
a computer-usable medium having computer-readable program code means embodied therein for smoothing block artifacts produced during video compression, the computer-readable program code means in the computer-program product comprising:
input means for receiving a series of pixels decompressed from a motion-picture-experts group (MPEG) compressed video stream, wherein a current series of pixels comprises at least five pixels;
maximum means for generating a maximum-allowed edge-pixel difference as a function of a quantization parameter, the quantization parameter indicating a degree of compression of an image;
difference generator means, receiving pixel components from an edge pair of adjacent pixels in adjacent blocks, for generating an edge-pixel difference;
limiter means, receiving the maximum-allowed edge-pixel difference and the edge-pixel difference, for generating a difference term, the difference term being the edge-pixel difference when the edge-pixel difference is between the maximum-allowed edge-pixel difference or a negation of the maximum-allowed edge-pixel difference, but being the maximum-allowed edge-pixel difference when the edge-pixel difference exceeds than the maximum-allowed edge-pixel difference or the negation of the maximum-allowed edge-pixel difference;
fractional difference generator means, receiving the difference term from the limiter means, for generating a plurality of fractional differences having a decreasing range of values that are fractions of the difference term; and applicator means, receiving pixel components from the current series of pixels that includes the edge pair of adjacent pixels in the adjacent blocks, for adding or subtracting the fractional differences from the fractional difference generator means to pixel components for pixels in the current series;
wherein successive pixels successively farther from the edge pair of adjacent pixels have successively decreasing fractional differences added or subtracted,
whereby edge-pixel differences are smoothed over the current series of pixels.

18. The computer-program product of claim 17 wherein the edge pair of adjacent pixels comprises a first current pixel in a current block and a first next pixel in a next block;
wherein the applicator means further receives the difference term from the limiter means, the applicator means for subtracting the difference term from the first current pixel, and for adding a fractional difference to the first next pixel;
wherein the applicator means adds a fractional difference of three-fourths of the difference term to the first next pixel in the next block.

19. The computer-program product of claim 18 wherein the current series of pixels comprises:
a second current pixel adjacent to the first current pixel in the current block;
a third current pixel adjacent to the second current pixel in the current block;
a fourth current pixel adjacent to the third current pixel in the current block;
a second next pixel adjacent to the first next pixel in the next block;
a third next pixel adjacent to the second next pixel in the next block;
wherein the applicator means adds a fractional difference of one-half of the difference term to the second next pixel in the next block;
wherein the applicator means adds a fractional difference of one-fourth of the difference term to the third next pixel in the next block;
wherein the applicator means subtracts a fractional difference of three-fourths of the difference term to the second current pixel in the current block;
wherein the applicator means subtracts a fractional difference of one-half of the difference term to the third current pixel in the current block;
wherein the applicator means subtracts a fractional difference of one-fourth of the difference term to the fourth current pixel in the current block.

20. The computer-program product of claim 17 wherein the pixel components are luminance Y values of a YUV pixels.

* * * * *